US008209814B2

(12) United States Patent
Kang et al.

(10) Patent No.: US 8,209,814 B2
(45) Date of Patent: Jul. 3, 2012

(54) AIR INTAKE FOR VACUUM-CONVEYANCE WASTE COLLECTION SYSTEM

(75) Inventors: Seung-Hyun Kang, Yongin-si (KR); Jong-Kyu Hwang, Anyang-si (KR); Yun-Ho Jung, Suwon-si (KR); Sang-Bong Chang, Seoul (KR)

(73) Assignees: Kolon Global Corporation, Gwacheon-si, Gyeonggi-do (KR); Eunsang Plant Co., Ltd., Siheung-si, Gyeonggi-do (KR)

( * ) Notice: Subject to any disclaimer, the term of this patent is extended or adjusted under 35 U.S.C. 154(b) by 463 days.

(21) Appl. No.: 12/579,736

(22) Filed: Oct. 15, 2009

(65) Prior Publication Data

US 2010/0236011 A1 Sep. 23, 2010

(30) Foreign Application Priority Data

Mar. 23, 2009 (KR) ........................ 10-2009-0024280

(51) Int. Cl.

| | |
|---|---|
| ***A47L 5/00*** | (2006.01) |
| ***A47L 9/00*** | (2006.01) |
| ***B65G 53/42*** | (2006.01) |
| ***B65G 53/26*** | (2006.01) |

(52) U.S. Cl. ............................. 15/326; 406/152; 406/86

(58) Field of Classification Search .................... 15/326; 406/152, 86

See application file for complete search history.

(56) References Cited

FOREIGN PATENT DOCUMENTS

| | | | | |
|---|---|---|---|---|
| KR | 0332249 | | | 10/2003 |
| KR | 10-2006-0103019 | A | | 9/2006 |
| KR | 1020060103019 | A | * | 9/2006 |

* cited by examiner

*Primary Examiner* — Bryan R Muller

(74) *Attorney, Agent, or Firm* — Law Offices of Albert Wai-Kit Chan, PLLC

(57) ABSTRACT

There is provided an air intake for a vacuum-conveyance waste collection system, to form a high-speed air flow by allowing air to enter a conveying line through which waste being put into a waste receiving device is conveyed to a central waste collection station.

The air intake for the vacuum-conveyance waste collection system according to the present invention comprises: an air inflow pipe 1 including an upper air inflow opening 1*a* and a lower air inflow opening 1*b* to allow outside air to enter; a noise pipe 4 with an upper end inserted under the air inflow pipe 1 and a sound absorption material 4*c* attached to an inner wall of the noise pipe 4; and a housing 5 including an air suction valve 6 installed inside and a sound absorption material 5*a* attached to an inner wall of the housing 5, the housing connected to a lower end of the noise pipe 4, to guide the air entered through the air inflow pipe 1 to a waste conveying line 10, wherein un upper rain cap in a cone shape is installed at an upper position in the air inflow pipe, a mesh is installed at the upper end of the noise pipe, and a lower rain cap in a frustum shape including a central through-hole is installed between the upper rain cap and the mesh.

8 Claims, 7 Drawing Sheets

(Fig. 3)
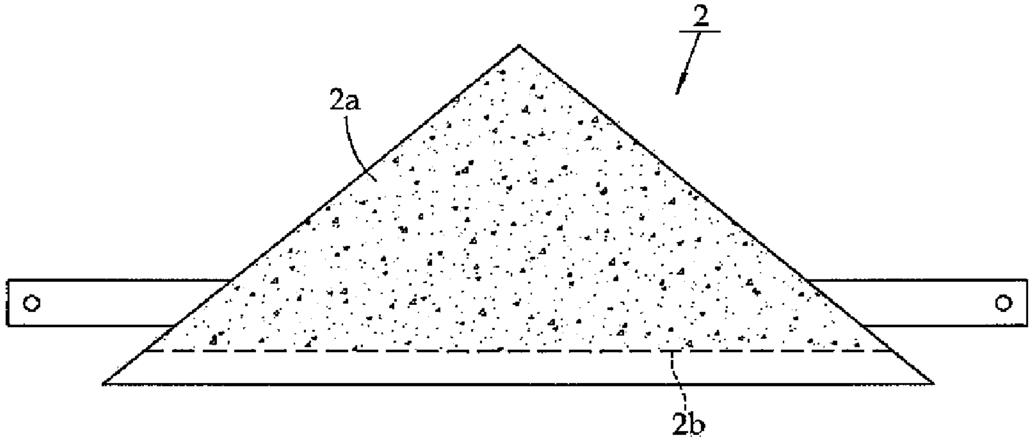

(Fig.4)
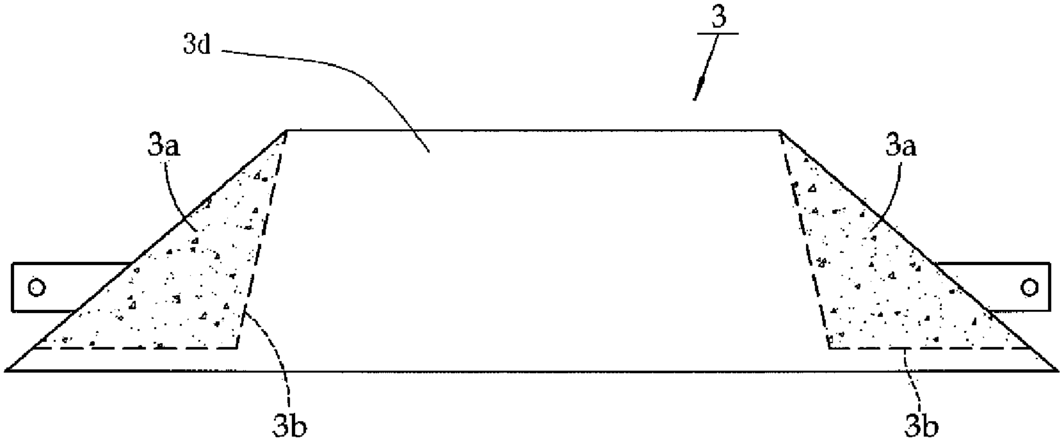

(Fig.5)
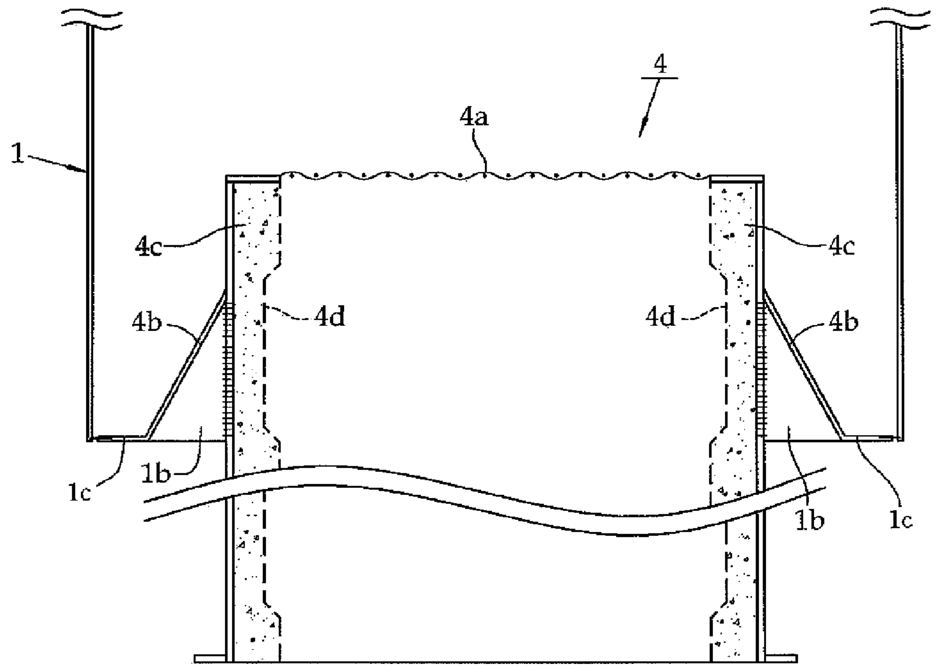

(Fig.6)
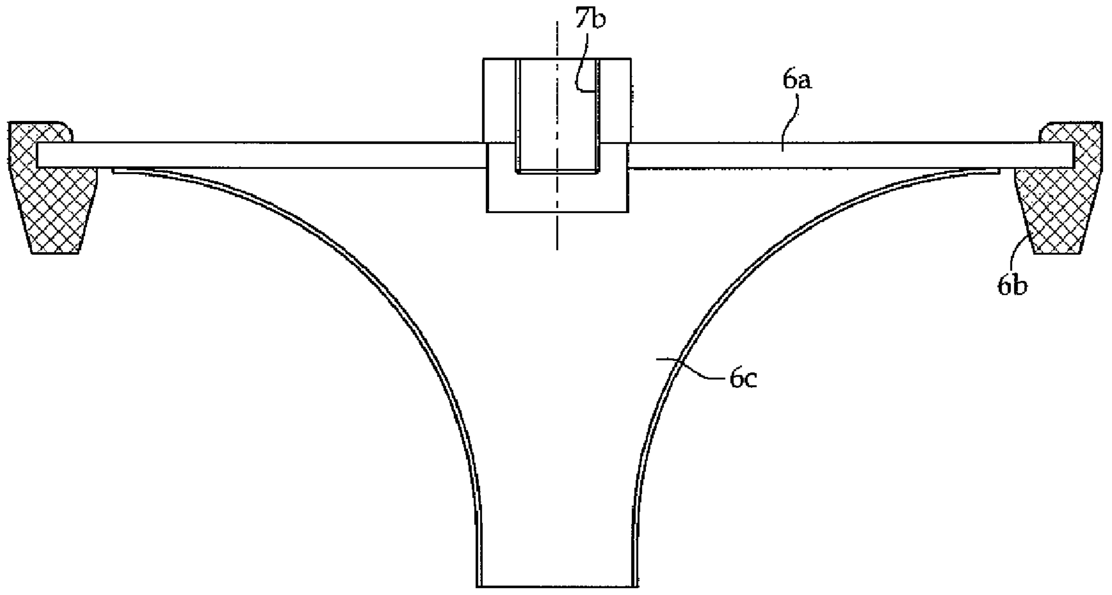

(Fig.7)
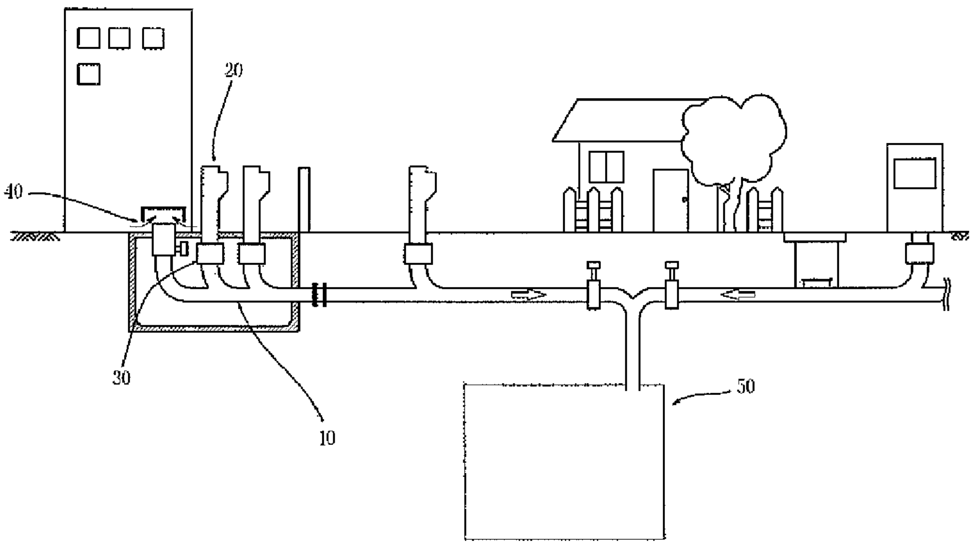

AIR INTAKE FOR VACUUM-CONVEYANCE WASTE COLLECTION SYSTEM

CROSS-REFERENCE TO RELATED APPLICATION

This application claims the benefit of Korean Patent Application No. 10-2009-0024280, filed Mar. 23, 2009, the disclosure of which is hereby incorporated herein by reference in its entirety.

BACKGROUND OF THE INVENTION

1. Field of the Invention

The present invention relates to an air intake for a vacuum-conveyance waste collection system, and more particularly, to an air intake for a vacuum-conveyance waste collection system, to form a high-speed air flow by allowing air to enter a conveying line through which waste being put into a waste receiving device is conveyed to a central waste collection station.

2. Description of the Related Art

In general, a vacuum-conveyance waste collection system (i.e., a waste transfer system) is installed in a housing development area. This system uses the same principle as that of a vacuum cleaner used at home. In this system, when waste is put into a waste receiving device installed at a certain place, the waste is conveyed from the waste receiving device to a central waste collection station through a waste conveying line buried underground, by a computer control system.

In most cases, since the waste receiving device of this waste collection system is installed at a long distance from the central waste collection station, the waste is to be effectively collected and conveyed to the central waste collection station through the conveying line. To this end, air flows into the conveying line, to generate a strong flow. By the flow of air, the waste is conveyed to and collected at the central waste collection station, along the conveying line. This waste collection system is installed at a large scale building area, a multi-unit building area (condominium/apartment) or the like, to provide more pleasant environments.

In the aforementioned waste collection system, an air intake is installed to supply high-speed air into the waste conveying line. Specially, parts of the air intake, which are positioned on the ground, are to secure an air suction channel, to make the admitted air to flow well, and to attenuate a noise generated when sucking the air. To this end, the air intake needs a large opening. When the air intake with a large-area opening is installed at the ground, the appearance around the air intake is not good. Moreover, a sound absorption material is installed inside an air suction side of the parts of the air intake positioned on/above the ground, to attenuate a noise. However, in the case where the external shape of the air intake is made in an unreasonably small size while the sound absorption material is installed inside, the air suction channel becomes too small and therefore the air does not flow well, causing a noise and air suction resistance.

As described above, in the conventional vacuum-conveyance waste collection system, when the external shape of the air intake is unreasonably reduced while the sound absorption material is installed inside the air suction side of the parts of the air intake to be positioned on/above the ground, the resistance generated when the air intake allows air to enter is increased. To deal with this problem, strong vacuum pressure is needed inside the waste conveying line and power consumption is increased accordingly. Moreover, when a vacuum level is increased by generating the strong vacuum pressure inside the conveying line, the flow of air becomes fast by the increase of the vacuum level, increasing a noise.

Therefore, the air intake needs to be designed and manufactured to minimize the noise and resistance of air entered through the air intake.

SUMMARY OF THE INVENTION

Therefore, it is an object of the present invention to provide an air intake for a vacuum-conveyance waste collection system, attenuating a noise and suction resistance of air being drawn into the air intake when waste put into a waste receiving device is conveyed to a central waste collection station through a conveying line, and having an improved air suction channel meeting the surroundings in appearance by reducing the area of an opening of the air intake.

In accordance with an embodiment of the present invention, there is provided an air intake for a vacuum-conveyance waste collection system comprising: an air inflow pipe including an upper air inflow opening and a lower air inflow opening to allow outside air to enter; a noise pipe with an upper end inserted under the air inflow pipe and a sound absorption material attached to an inner wall of the noise pipe; and a housing including an air suction valve installed inside and a sound absorption material attached to an inner wall of the housing, the housing connected to a lower end of the noise pipe, to guide the air entered through the air inflow pipe to a waste conveying line, and wherein an upper rain cap in a cone shape is installed at a upper position in the air inflow pipe, a mesh is installed at the upper end of the noise pipe, and a lower rain cap in a frustum shape having a central through-hole is installed between the upper rain cap and the mesh.

Preferably, the air suction valve comprises: a cut-off plate moving up and down by an air cylinder and a cylinder rod installed under the air cylinder, to control the amount of the air conveyed to the conveying line by opening/closing an air discharge pipe; and an air inflow guider installed to be attached to a lower end of the cut-off plate, to effectively guide the air.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 3 is a sectional view illustrating an upper rain cap of the air intake;

FIG. 4 is a sectional view illustrating a lower rain cap of the air intake;

FIG. 5 is a sectional view illustrating a noise pipe of the air intake;

FIG. 6 is a sectional view illustrating a cut-off plate and an air inflow guider of the air intake; and FIG. 7 is a flow diagram of the vacuum-conveyance waste collection system.

DESCRIPTION OF REFERENCE NUMBERS OF MAJOR ELEMENTS

| | | | |
|---|---|---|---|
| 1: | air inflow pipe | 1a: | upper air inflow opening |
| 1b: | lower air inflow opening | 1c: | rainwater discharge opening |
| 2: | upper rain cap | 2a, 3a: | sound absorption materials |
| 2b, 3b: | perforation plates | 2c, 3c: | connection bars |
| 3: | lower rain cap | 3d: | central through-hole |
| 4: | noise pipe | | |
| 4a: | mesh | 4b: | noise pipe bracket |
| 4c: | sound absorption material | 4d: | perforation plate |
| 5: | housing | 5a: | sound absorption material |
| 5b: | perforation plate | | |
| 6: | air suction valve | 6a: | cut-off plate |
| 6b: | packing | 6c: | air inflow guider |
| 7: | air cylinder | 7a: | cylinder rod |
| 7b: | rod connection hole | 8: | cylinder support |
| 8a: | cylinder base | 8b: | flange |
| 9: | air discharge pipe | 10: | conveying line |
| 11, 12: | air | 13: | reflective noise |
| 20: | waste receiving device | 30: | waste discharge valve |
| 40: | air intake | 50: | central waste collection station |

DETAILED DESCRIPTION OF THE PREFERRED EMBODIMENT

The present invention will now be described more fully hereinafter with reference to the accompanying drawings, in which preferred embodiments of the invention are shown. However, it is to be understood that the scope of the invention is not limited to the disclosed embodiments.

Figure 1:
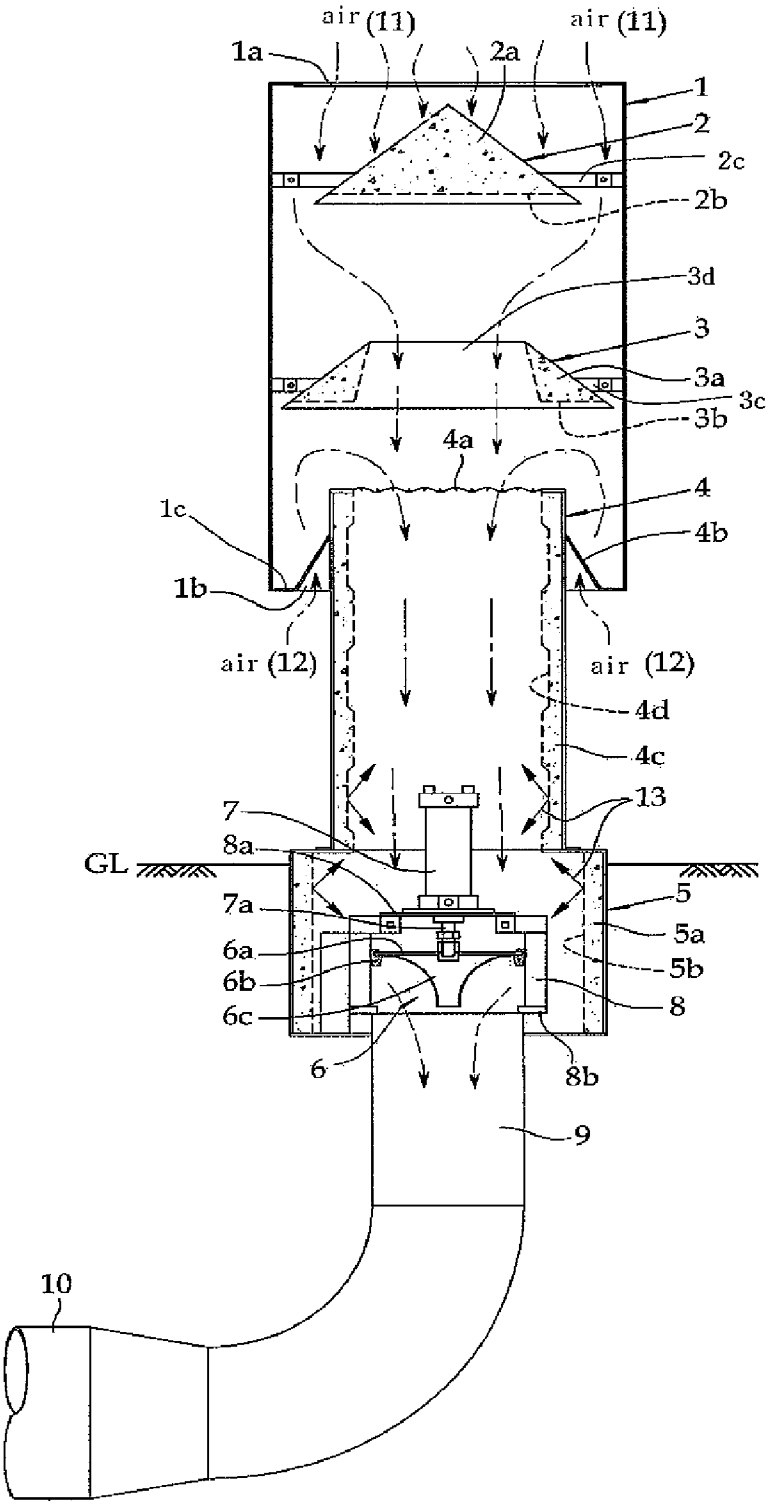
FIG. 1 is a front sectional view illustrating an air intake being open in a vacuum-conveyance waste collection system according to the present invention.
Figure 2:
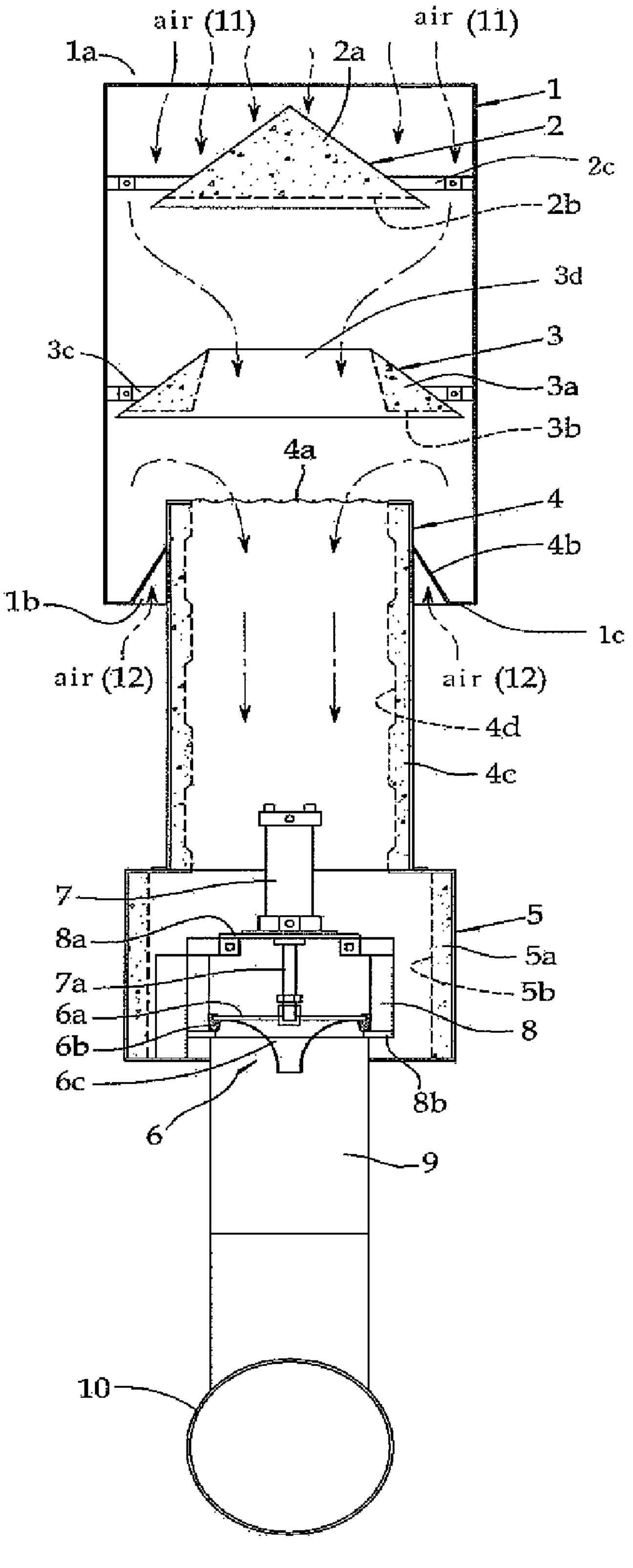
FIG. 2 is a side sectional view illustrating the air intake being closed.

An air intake for a vacuum-conveyance waste collection system according to a preferred embodiment of the present invention will be described with reference to FIGS. 1 through 7.

In a large-scale housing development area, a vacuum-conveyance waste collection system (i.e., a waste transfer system) is installed for use. In this system using the same principle as that of a vacuum cleaner used at home, when waste is put into a waste receiving device 20 installed at a certain place, the waste is conveyed from the waste receiving device 20 to a central waste collection station 50 through a discharge valve 30, along a waste conveying line 10 buried underground, by a computer control system.

In most cases, the waste receiving device 20 of this waste collection system is installed at a long distance from the central waste collection station 50. To effectively collect and convey the waste to the central waste collection station 50, along the conveying line 10, high-speed air needs to be supplied into the waste conveying line 10. To this end, an air intake 40 is installed. When a fan (not shown) installed in the central waste collection station 50 operates, the air flows into the conveying line 10, thereby generating a strong flow of the air. By this flow of the air, the waste is conveyed to and collected in the central waste collection station 50, along the conveying line 10. This waste collection system is installed at a large scale building area, a multi-unit building area (condominium/apartment) or the like, to provide more pleasant environments.

The present invention relates to the air intake 40 for the vacuum-conveyance waste collection system. When the waste put into the waste receiving device 20 is conveyed to the central waste collection station 50, the air intake 40 is provided to draw outside air into the conveying line 10, so that the waste is conveyed by the flow of the air. The air intake 40 comprises: an air inflow pipe 1 including an upper air inflow opening 1*a* and a lower air inflow opening 1*b* to allow outside air to enter; a noise pipe 4 with an upper end inserted under the air inflow pipe 1 and a sound absorption material 4*c* attached to an inner wall of the noise pipe 4; and a housing 5 including an air suction valve 6 installed inside and a sound absorption material 5*a* attached to an inner wall of the housing 5, the housing connected to a lower end of the noise pipe 4, to guide the air entered through the air inflow pipe 1 to a waste conveying line 10.

The air inflow pipe 1 and the noise pipe 4 are installed on the ground. The diameter of the air inflow pipe 1 is greater than that of the noise pipe 4, so that the noise pipe 4 can be easily insertedly connected to the air inflow pipe 1. The lower air inflow opening 1*b* is formed at a surplus space around an outer circumference of the inserted noise pipe 4. A rainwater discharge opening 1*c* is further formed proximately to the lower air inflow opening 1*b*, to discharge the rainwater dropping from the upper part of the air inflow pipe 1.

An upper rain cap 2 in a cone shape is installed at an upper position in the air inflow pipe 1, a mesh 4*a* is installed at the upper end of the noise pipe 4, and a lower rain cap 3 in a frustum shape including a central through-hole 3*d* is installed between the upper rain cap 2 and the mesh 4*a*.

A sound absorption material 2*a* fills the upper rain cap 2 and a perforation plate 2*b* is installed at a lower part of the sound absorption material 2*a*. A sound absorption material 3*a* fills the lower rain cap 3 and surrounds the central through-hole 3*d*, and a perforation plate 3*b* is installed at a lower part and inner side surface of the sound absorption material 3*a*.

Outside air 11 and 12 flow in the air inflow pipe 1 being open at its top and bottom, through the upper air inflow opening 1*a* and the lower air inflow opening 1*b*. Under the upper air inflow opening 1*a*, the upper rain cap 2 is connected to an inner wall surface of the air inflow pipe 1 by a connection bar 2*c* such that a regular interval therebetween is maintained to form a space. Under the upper rain cap 2, the lower rain cap 3 is connected to the upper rain cap 2 at a regular interval and is also connected to the inner wall surface of the air inflow pipe 1 by a connection bar 3*c* such that a regular interval therebetween is maintained to form a space.

When it rains, the upper rain cap 2 prevents rainwater which enters through the upper air inflow opening 1*a* of the air inflow pipe 1 from flowing into the noise pipe 4 connected under the air inflow pipe 1. Since the upper rain cap 2 has the cone shape, the rainwater flows down, along the inclined plane of the cone so, so that it is deflected away from the noise pipe 4 and discharged outside through the rain discharge opening 1*c* formed at the lower end of the air inflow pipe 1.

The lower rain cap 3 which is installed, at the regular space, under the upper rain cap 2 has the frustum shape, including the through-hole 3*d* formed at its center. The rainwater which flows down from the air inflow pipe 1 and the upper rain cap 2, along the inclined plane of the frustum is discharged through the rain discharge opening 1*c*. The air 11 introduced from the outside through the central through-hole 3*d* is discharged to the conveying line 10 through the noise pipe 4 and the air suction valve 6 installed inside the housing 5. The upper rain cap 2 and the lower rain cap 3 are installed at the upper position and the lower position within the air inflow pipe 1, respectively. Therefore, when it rains, the upper rain caps 2 and 3 basically prevent the rain water from flowing into the air intake 40.

The shapes of the upper and lower rain caps 2 and 3 have the functions of attenuating a self-generated noise which may occur by an air current when air enters through the air inflow opening and guiding the admitted air 11 to flow into the noise pipe 4, thereby minimizing a loss in air suction. Further, to attenuate a reflective noise generated inside the noise pipe 4 by the admitted air 11, the upper rain cap 2 is filled with the sound absorption material 2*a* and the lower rain cap 3 around the central through-hole 3*d*, that is, except for the central through-hole 3*d*, is filled with the sound absorption material 3*a*. The perforation plates 2*b* and 3*b* are installed at the bottoms and inner side surfaces of the sound absorption materials 2*a* and 3*a*, to support the sound absorption materials 2*a* and 3*a* against the high-speed air flow and to maintain the function of the sound absorption materials 2*a* and 3*a*.

The upper end of the noise pipe 4 is inserted into the lower part of the air inflow pipe 1 and it is connected to the air inflow pipe 1 by a bracket 4*b*. The mesh 4*a* is installed on the upper end of the noise pipe 4, to filter an alien substance which is likely to enter with the air when the air enters and thus to secure safety inside the noise pipe 4. The sound absorption material 4*c* is attached to an inner wall surface of the noise pipe 4, to attenuate a noise which may be generated when the admitted air passes through the noise pipe 4. A perforation plate 4*d* is installed on an exposed surface of the sound absorption material 4*c*, to securely support the sound absorption material 4*c* against the high-speed air flow.

When the thickness of the sound absorption material 4*c* attached to the inner wall surface of the noise pipe 4 varies, the area of the inside of the noise pipe 4 varies. Accordingly, a sound absorption coefficient of noise reflection and resonance is improved, thereby increasing the effect of preventing the noise. Preferably, the surface of the sound absorption material 4*c* may be formed to be irregular in a perpendicular direction, to improve the effect of attenuating the noise. The perforation plate 4*d* is installed on the irregular surface. The length of the noise pipe 4 may be varied according to the flow and speed of the admitted air.

The air entered through the noise pipe 4 is discharged to the conveying line 10 through the air discharge pipe 9 after passing through the housing 5 installed underground. The air suction valve 6 is installed in the housing 5 and a sound absorption material 5*a* is attached to an inner wall surface of the housing 5. The sound absorption material 5*a* supported by a perforation plate 5*b* attenuates a reflective noise 13 which may be generated when the air passing through the noise pipe 4 passes through the air suction valve 6 inside the housing 5, thereby preventing the reflective noise 13 from being transmitted to the outside.

The air suction valve 6 comprises: a cut-off plate 6*a* moving up and down by an air cylinder 7 and a cylinder rod 7*a* installed under the air cylinder 7, to open/close the air discharge pipe 9, thereby controlling the amount of the air conveyed to the conveying line 10; and an air inflow guider 6*c* installed to be attached to a lower end of the cut-off plate 6*a*, to effectively guide the air. The air inflow guider 6*c* is in a funnel shape which becomes progressively narrower from an upper part to a lower part. The air inflow guider 6*c* and the cut-off plate 6*a* operate in a single body.

A rubber packing 6*b* is installed at an outer edge of the cut-off plate 6*a*, to maintain airtightness between the air suction valve 6 and the air discharge pipe 9 when the air suction valve 6 is closed.

A cylinder support 8 is installed at the outline of the air suction valve 6, to support the air cylinder 7 operating the air suction valve 6. A lower end of the cylinder support 8 is securely fixed to a flange 8*b* installed at an upper end of the air discharge pipe 9 by a connection unit (bolt, nut or the like). A cylinder base 8*a* is installed on an upper end of the cylinder support 8. The air cylinder 7 is fixed on the cylinder base 8*a*. The cylinder rod 7*a* of the air cylinder 7 installed on the bottom of the cylinder base 8*a* is connected to a cylinder rod connection hole 7*b* formed in the middle of the cut-off plate 6*a* so as to be connected to the cut-off plate 6*a*.

The air inflow guider 6*c* is in the streamlined funnel shape which progressively becomes narrower from the upper part to the lower part, to attenuate the noise generated when the air flows into the air discharge pipe 9 and to decrease suction resistance of the air 11 and 12. Further, preferably, the cylinder support 8 may be formed to have a rounded edge so as to be streamlined, to attenuate a contact noise with the admitted air.

When the cylinder rod 7*a* moves vertically by the operation of the air cylinder 7 and is inserted into the air cylinder 7, the air inflow guider 6*c* and the cut-off plate 6*a* are spaced apart from the upper end of the air discharge pipe 9 at a certain distance. Then, the air suction valve 6 is open so that the air entered from the outside flows into the conveying line 10 through the air discharge pipe 9. When the cylinder rod 7*a* inserted into the air cylinder 7 moves vertically and is out of the air cylinder 7, the air inflow guider 6*c* and the cut-off plate 6*a* are in contact with the upper end of the air discharge pipe 9, so that the air suction valve 6 closes the air discharge pipe 9. That is, the air suction valve 6 is operated by the air cylinder 7, thereby opening or closing the air discharge pipe 9. The opening/closing function admits or blocks the flow of the air entering the air intake 7 into the conveying line 10 through the air discharge pipe 9.

The air intake 40 for the vacuum-conveyance waste collection system according to the present invention is used to convey the waste placed into the waste receiving device (not shown) to the central waste collection station 50 by the application of the high-speed air flow.

In the air intake 40, when the air suction valve 6 is open by operating the fan (not shown) is operated and the air cylinder 7, the outside air which enters through the upper air inflow opening 1*a* and the lower air inflow opening 1*b* of the air inflow pipe 1 passes through the air inflow pipe 1 and the noise pipe 4, flows into the housing 5 and is drawn into the conveying line 10 through the air suction valve 6. Then, align substances or the like are filtered by the mesh 4*a* installed on the noise pipe 4.

While the air flowing into the housing 5 passes through the air suction valve 6, a noise is generated by the flow and speed of the air. The noise is mostly attenuated by the sound absorption material 5*a* installed inside the housing 5 and the sound absorption material 4*c* installed on the inner wall surface of the noise pipe 4.

Further, a high frequency noise with high straightness is not completely attenuated by the sound absorption material 4*c* attached to the inner wall surface of the noise pipe 4 and the sound absorption material 5*a* installed inside the housing 5, however, it is mostly attenuated by the sound absorption materials 2*a* and 3*a* installed inside the upper and lower rain caps 2 and 3, respectively.

The air passing through the housing 5 is discharged to the air discharge pipe 9 through the air inflow guider 6*c* of the air suction valve 6 and flows into the conveying line 10 connected to the lower end of the air discharge pipe 9. This high-speed air flow makes the waste to be conveyed to the central waste collection station.

As described above, in the air intake for the vacuum-conveyance waste collection system according to the present invention, the air inflow openings to allow the outside air to enter are formed at the upper and lower position of the air inflow pipe. Therefore, since the external shape of the air intake is reduced, the air suction channel is improved, making it possible to manufacture a compact air intake in size and to harmonize the air inflow pipe and the noise pipe installed on/above the ground with the surroundings.

Furthermore, since the upper rain cap in the cone shape and the lower rain cap in the frustum shape guide the flow passage of the air downward, a loss in air suction is minimized and a noise is reduced. The sound absorption material attached to the inside of the upper rain cap and lower rain cap is reflected in the noise pipe, attenuating the transmitted noise.

Furthermore, the length of the noise pipe is variable according to the flow and speed of the air being sucked. The noise generated inside the air suction valve, installed in the housing positioned underground, and transmitted to the outside is attenuated by the sound absorption material attached to the inner wall of the housing. Since the upper and lower air inflow openings of the air inflow pipe have a large suction area, the suction resistance of the air is decreased, making it possible to attenuate a self-generated noise by an air current generated in the air inflow pipe installed at the ground. The air inflow guider of the air suction valve is formed in a streamlined funnel shape, minimizing the resistance and noise which may be occurred when the air suction valve is open so that the air is discharged to the air discharge pipe.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. An air intake for a vacuum-conveyance waste collection system comprising:

an air inflow pipe including an upper air inflow opening and a lower air inflow opening to admit outside air;

a noise pipe including an upper end inserted under the air inflow pipe, wherein a sound absorption material is attached to an inner wall surface of the noise pipe; and a housing including an air suction valve, wherein a sound absorption material is attached to an inner wall surface of the housing and the housing is connected to a lower end of the noise pipe, thereby guiding the air admitted through the air inflow pipe to a waste conveying line, wherein an upper rain cap in a cone shape is installed at an upper position in the air inflow pipe, a mesh is installed at the upper end of the noise pipe, and a lower rain cap in a frustum shape including a central through-hole is installed between the upper rain cap and the mesh.

2. The air intake according to claim 1, wherein the upper rain cap includes a sound absorption material to fill inside, and a perforation plate to be installed at a lower part of the sound absorption material.

3. The air intake according to claim 1, wherein the lower rain cap includes a sound absorption material to fill inside, surrounding the central through-hole.

4. The air intake according to claim 1, wherein the air suction valve comprises:

a cut-off plate for moving vertically by an air cylinder and a cylinder rod installed under the air cylinder, to open/close an air discharge pipe, thereby controlling the amount of the air conveyed to the conveying line; and an air inflow guider installed to be attached to a lower end of the cut-off plate, to effectively guide the air.

5. The air intake according to claim 4, wherein the air inflow guider is in a funnel shape.

6. The air intake according to claim 1, wherein the diameter of the air inflow pipe is greater than that of the noise pipe.

7. The air intake according to claim 1, wherein the upper rain cap and the lower rain cap are installed to be spaced apart from an inner wall of the air inflow pipe.

8. The air intake according to claim 1, wherein the air inflow pipe includes a rainwater discharge opening formed at its lower end.

* * * * *

UNITED STATES PATENT AND TRADEMARK OFFICE

CERTIFICATE OF CORRECTION

PATENT NO. : 8,209,814 B2
APPLICATION NO. : 12/579736
DATED : July 3, 2012
INVENTOR(S) : Kang et al.

It is certified that error appears in the above-identified patent and that said Letters Patent is hereby corrected as shown below:

On cover page, item (73) Assignees 3rd line should be -- Eunsung Plant Co., Ltd., Siheung-si --

Signed and Sealed this
Fourteenth Day of August, 2012

David J. Kappos
*Director of the United States Patent and Trademark Office*